Dec. 27, 1966   E. A. FERRIS ET AL   3,294,340
VEHICLE SAFETY BELT RETRACTING DEVICE
Filed Jan. 13, 1964   2 Sheets-Sheet 1
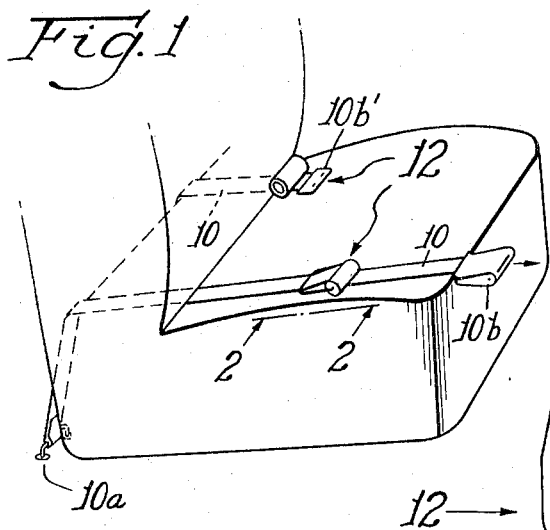
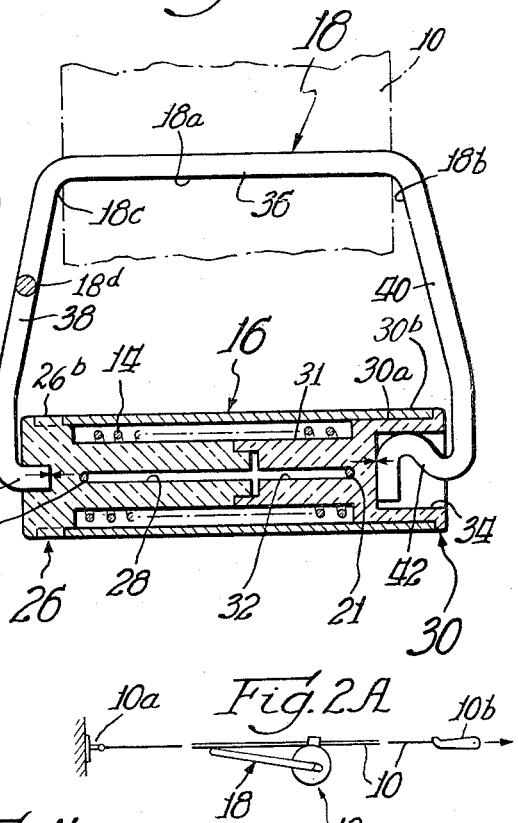
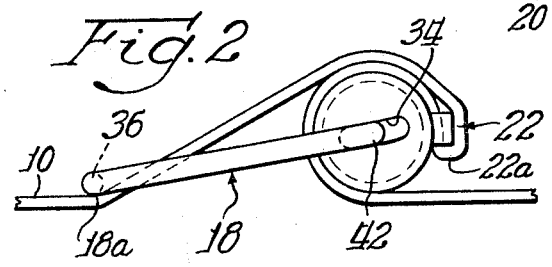
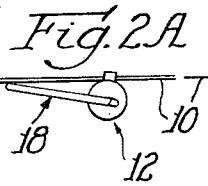
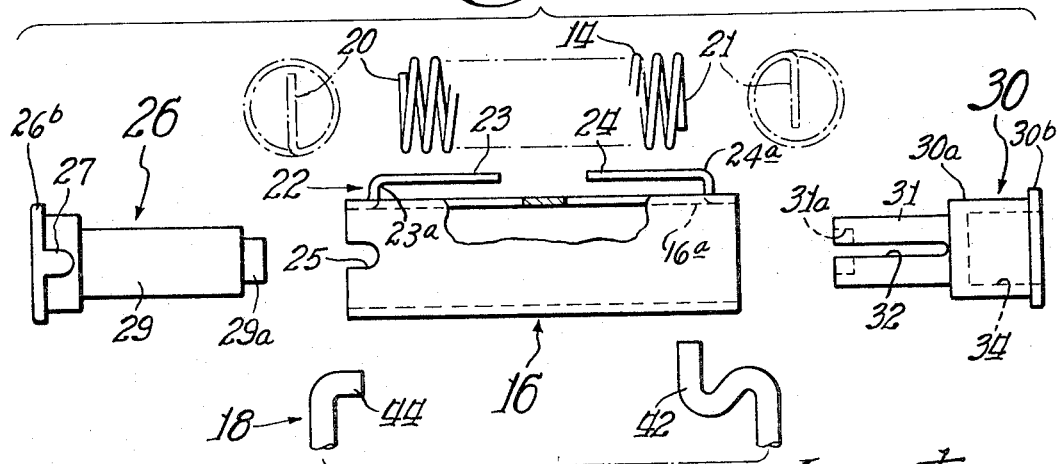
Inventors:
Ernest A. Ferris and
Stephen J. Zanoni
By: Lyle S. Motley Atty.

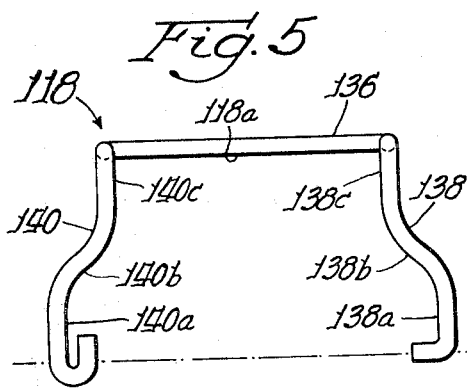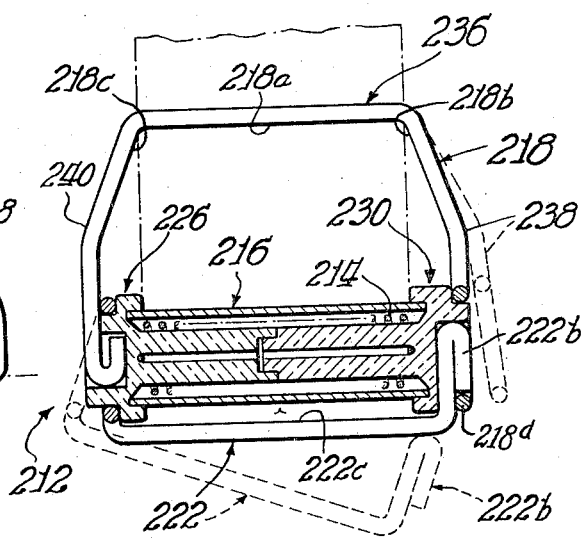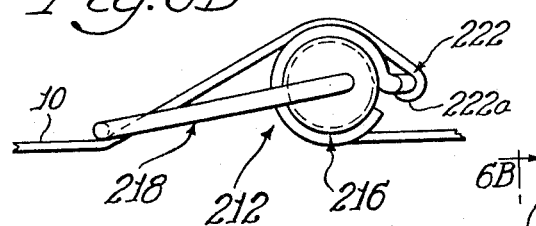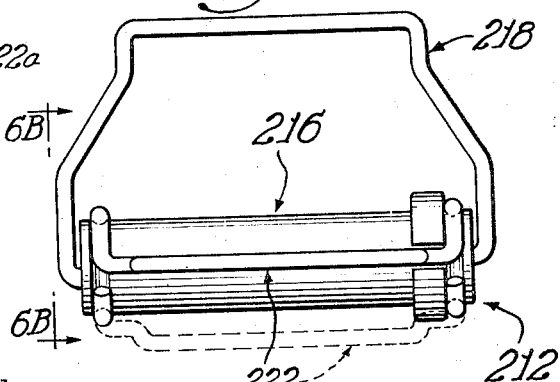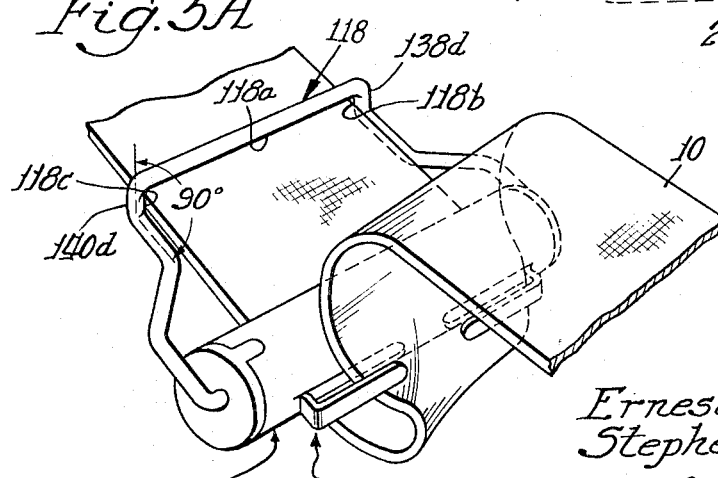

United States Patent Office 3,294,340
Patented Dec. 27, 1966

3,294,340
VEHICLE SAFETY BELT RETRACTING DEVICE
Ernest A. Ferris, Downers Grove, and Stephen J. Zanoni, Glen Ellyn, Ill., assignors to Borg-Warner Corporation, Chicago, Ill., a corporation of Illinois
Filed Jan. 13, 1964, Ser. No. 337,430
10 Claims. (Cl. 242—107.11)

This invention relates to a belt take-up or retracting means particularly for use in conjunction with flat type safety belts in vehicles such as automobiles or aircraft.

One of the difficulties experienced with previously known automobile safety seat belts, for example, has been that when not in use, the outer portions often hang out of the car door or lie rumpled on the seat, or become somewhat inaccessible when they slip between or behind the seat. While there have been proposed devices directed towards alleviating these difficulties, generally they have involved cumbersome structures which are often complicated and expensive to manufacture. Some of these prior art belt take-up devices require, for example, a container or housing within which there is located a reel upon which the belt may be rolled up with the result of objectionable bulk and lack of visibility of the condition of the belt, this lack of visibility being dangerous from a safety point of view. In addition, some of these prior retractor devices present special installation problems in that they require that the container or housing be attached or anchored to the flooring of the vehicle or to the seat structure itself. This is objectionable as experience has shown that the belt should take the tension load entirely through the belt itself and not through the reel or housing when the belt is being used and is called upon to perform its safety function.

It is a principal object of this invention to provide an improved belt take-up means or retractor device which has relatively simple parts and is relatively inexpensive to manufacture and efficient in its operation, as well as possessing a comparatively long wear life.

Another object is to provide an improved relatively simple belt take-up means or retractor device which requires no fastening connection with the vehicle belt anchoring means except through the belt itself, and hence a unit that may be attached to the belt at any desired position spaced from the ends of the belt and subsequently adjusted to any desired intermediate position on the belt and which includes a compact reel and torsion spring motive means effective to simultaneously roll up the belt from both sides of the take-up means or retractor.

Another more specific object is to provide an improved belt take-up means comprising a hollow reel and torsion spring energy storing means carried within the hollow reel which is effective to roll up the belt simultaneously from both sides of the take-up means in a multiple layered spiral formation, thus effectively reducing the total number of rotations required, and hence the tension or loading necessary in the energy storing means by thus reducing the effective length of the belt that must be rolled up to substantially one-half of its full length.

A still further and more detailed object is to provide an improved vehicle safety belt retracting device of the torsion spring motivated type including means defining a hollow reel, the torsion spring being located in the hollow reel and characterized by having the device adapted to be mounted on a vehicle safety belt at an intermediate position spaced from the usual belt anchor end and from the usual buckle or opposite termnial end of the belt, the reel and belt thereon being in full view at all times, the spacing of the device from the anchor end being at a maximum when the belt is completely extended, the pull on the buckle end of the belt by the user being taken entirely through the belt itself with the retracting device being, for all practical purposes, idly floating adjacent the belt in such extended position of the belt; while alternatively, the relaxation of the outer end or buckle terminal of the belt is effective to permit the torsion spring motive means to roll up the belt from each side in double spiral layers, each turn of the motive means taking up two circumferential lengths of belt, the retracting device with the belt thereon constituting substantially the entire bulk of the reel and belt roll as contrasted with previously available devices enclosed in a bulky housing, said device with the belt turns thereon traveling on the belt in the direction of the anchored end of the belt so as to eliminate the previously experienced dangling of the belt from the door where the same has been subject to becoming soiled and at times caught in the door upon being closed.

The foregoing and other objects and advantages of the present invention will become apparent from the following detailed description thereof when read in conjunction with the accompanying drawings, wherein:

FIGURE 1 is a perspective-like view of a vehicle seat equipped with safety belts and showing one preferred form of retractor device, one belt section being shown pulled out in extended position and another portion in retracted or rolled-up position;

FIGURE 2 is a view taken along line 2—2 of FIGURE 1;

FIGURE 2A is a view similar to that of FIGURE 2 but showing the relationship of belt and reel when the belt is fully extended and the pull is being taken directly through the belt to the vehicle anchor.

FIGURE 3 is an assembly in longitudinal cross-section of the preferred form of the belt take-up device of FIGURE 2;

FIGURE 4 is an exploded view of the parts of the belt take-up device of FIGURES 1 through 3;

FIGURE 5 is a view corresponding in part to FIGURE 3, but disclosing a modified form of reaction bale to which the present invention is particularly directed;

FIGURE 5A is a perspective-like view similar to that of FIGURE 3 but not in cross section and characterized by the incorporation of the reaction bale of FIGURE 5, bringing out the manner in which the belt may be readily introduced into the fastening yoke from the side of the belt;

FIGURE 6 shows a still further preferred modification of retractor device in longitudinal cross section bringing out to advantage the releasability of the belt anchor carried at the periphery of the reel for ready introduction of the belt from the side thereof;

FIGURE 6A is an assembly view of the modification of FIGURE 6; and

FIGURE 6B is a view taken along line 6B—6B of FIGURE 6A.

Referring now to FIGURE 1, there is illustrated generally two seat belt sections or lengths 10 having their inner terminals attached to anchor 10a on a vehicle with the outer ends terminating in buckle elements 10b and 10b', the belt sections being shown resting upon the vehicle seat. Belt take-up or retractor means or device 12 is attached to at least one and preferably both belt sections at approximately the midpoint of that portion of the respective seat belts section protruding onto the seat and shown in solid lines. One section is shown in extended position and the other is shown in retracted position. It is noted that two take-up devices would normally be used in conjunction with a complete two piece seat belt.

The present invention comprises an improved compact, open-to-view construction of an independent, self-contained belt retractor or roll-up device which includes improved means for readily installing a vehicle safety belt of the flat substantial width type, from the side of the belt making it unnecessary to thread the end of the belt through the means for attaching the belt to the periphery of the reel.

One of the features to which the present invention is particularly directed is the provision of an improved form of wire-like yoke or attaching anchor extending radially outwardly from and carried at the periphery of the reel and extending transversely across and in engagement with the bight portion of the belt and further particularly characterized by having a portion thereof releasable for the ready introduction of the belt from the top side thereof, as will appear from the later description of FIGURE 6.

In its broad concept, the preferred embodiment of the present invention disclosed in FIGURES 2 through 4 being specifically claimed herein, includes the retractor device indicated generally at 12 as comprising essentially an energy storing means in the form of an elongated helical torsion spring 14; an elongated hollow tubular reel 16 within which the torsion spring is located for compactness and efficiency; an improved form of torsion reaction member or wire-like bale or hinge 18 connected to the energy storing means 14 and to the reel 16 in an improved manner such that the torque reaction is taken by the bale slidably guidably engaging the belt section 10 to which the device is adapted to be attached, while the reel 16 includes unique end closure means and is provided with yoke or fastening means 22 extending radially outwardly from and carried at the periphery of the reel adapted to engage and drivingly connect the belt with the energy storing means and reel in a manner such that the belt will be wound on the reel in double spiral layers in successively increasing increments by the action of the spring upon release of the belt by the user and subsequent withdrawal by the user causing reverse rotation of the reel and the energizing of the torsion spring.

More specifically, the retractor device 12 comprises an energy storing elongated helical coil torsion spring 14 of an axial length occupying a substantial portion of the axial dimension of the reel 16, and corresponding substantially to the same axial length as the width of the belt, the spring being received within the confines of the hollow tubular reel defining means proper and embraced within the convolutions of the belt. The torque reaction defining means or wire-like bale indicated generally at 18 is provided with an elongated belt engaging reaction surface 18a for slidably guidably engaging the belt as the same is rolled up upon the reel and withdrawn therefrom. The torque reaction bale surface 18a functions to engage the belt in guided relation at a position spaced from the axis of the reel and is further so connected to the spring and reel, in a manner to be described, as to cause the spring to be placed in tension when the belt is withdrawn from the reel and to cause the belt to be wound up upon the reel when the belt is released by the user. Tubular reel 16 has a relatively small diameter in relation to its coaxial length, thus resulting in confining the overall diameter of the belt roll thereon to a minimum, since any excess bulk on the seat of the associated vehicle would be very objectionable. In actual commercially acceptable structures, such as that shown in FIGURE 3, the axial length to diameter is at least three to one. Expressed in general terms, the diameter of the tubular reel is only a small fraction of the axial length thereof.

Referring in greater detail to the elongated hollow or tubular reel 16, the same may be stamped from flat sheet stock which is then formed or rolled into a tubular shape. The reel proper 16 is provided on the periphery thereof with belt fastening means in the form of a two element yoke 22 including tabs 23 and 24 spaced radially outwardly from the outer periphery of the reel a distance substantially the thickness of the belt for clampingly attaching the belt at the bight portion 22a of the belt section 10 against the outer periphery of the reel. The yoke 22 may be formed as an integral part of the member 16 by stamping the arms or tabs 23 and 24 from within the confines of the metal blank employed in making the tubular reel member proper 16. It will be seen that a relatively flat type belt of substantial width relative to the thickness thereof and effective to distribute the force of impact of a person using the belt may be easily slipped into and under the fastening yoke 22 as it is open at the general midposition of the yoke. Thereafter, the tangs or tabs 23, 24 are bent radially inwardly to thus clamp the belt in place against the outer periphery of the reel 16 at the selected bight position 22a on the belt. This construction is particularly advantageous where the device is to be used on seat belts which have already been installed on a vehicle, the opening between the juxtaposed terminals of the yoke tangs 23, 24 making it unnecessary to disassemble the vehicle anchor 10a in order to install the safety belt of the retractor. The broad feature of providing the herein described split or discontinuous form of bale tabs or tangs, the inner terminals of which are spaced apart to make provision for the ready insertion and removal of a flat belt, is disclosed and claimed broadly in a companion case in the joint names of Herbert A. McAninch and Hugo W. Velander, S. N. 336,896 filed January 10, 1964. This subject matter forms a part of this Ferris and Zanoni application only in the unique distinguishing features of the particular modification of fastening or anchoring means 22 disclosed herein and including striking these tabs 23, 24 from within the confines of the blank from which the reel 16 is formed. In its still more specific aspects, the present invention contemplates an uninterrupted form of yoke such as shown in FIGURE 6 and wherein at least a portion thereof is readily releasable for the installation of a belt from the side of the reel or belt.

Thus, the present invention contemplates particularly the important alternative modification shown in FIGURE 6, including means for fastening or anchoring the belt at the bight portion 222a thereof to the periphery of the reel, and an uninterrupted yoke 222. In its preferred form, such yoke 222 is made readily releasable for the purpose of introducing and removing the belt from the side thereof, thus avoiding the necessity of threading the end of the belt through the fastening means and also avoiding the necessity for splitting the yoke, as is done in connection with the modification of FIGURE 4. This arrangement will be described more specifically hereinafter in connection with the modification of FIGURE 6.

Referring more specifically to FIGURE 3 and to the connecting means between the reaction bale 18 and the spring 14, and between the bale and the reel, the same may include an end cap or closure member 26 having the general formation of a bottle stopper, located at or as shown inserted into the left open terminal of the hollow or tubular reel member proper 16 as viewed in FIGURE 3. For providing a torque transmitting coupling, a pair of diametrically opposed axially extending bosses 27 are formed on the left end of the closure member, cap, or stopper-like closure plug 26. These bosses are received by axially facing slots 25 formed in the end of the tubular reel member 16. Thus the closure plug 26 and the tubular reel 16 are drivingly connected. The inner portion 29 of the closure member or cap 26 is formed with a coaxial slot or groove 28 for receiving in driving relation the diametrically extending connecting means 20 formed at the left end or terminal of the torsion spring means 14 as viewed in FIGURES 3 and 4. The inner portion 29 of the closure member or cap 26 is of a smaller diameter than the internal diameter of the reel 16, to thus provide a space between the periphery of the reduced portion 29 and the inner periphery of the tubular reel proper 16 for the reception of the convolutions of torsion spring 14. It will be observed that since the closure member or end cap 26 is thus not rotatable relative to the tubular member 16, the spring 14 is in effect drivingly attached to the tubular reel at the left terminal thereof as viewed in FIGURES 3 and 4.

A second closure member, end cap or stopper-like member 30 is located at the opposite terminal of tubular reel 16. In this particular modification, end cap 30 is likewise inserted into tubular reel member 16 for supporting the same in bearing relationship thereto, cylindrical outer peripheral surface 30a functioning as a journal or bearing for tubular member 16. Closure member 30 is also formed with a coaxially extending slot or groove 32 in the inner portion thereof, functioning as a driving connection for the other terminal or end portion of the torsion spring 14 through the diametrically extending connection means 21 formed at the right end of the spring 14 as viewed in FIGURE 4. At its outer end, the end cap or closure member 30 has formed therein a non-circular slot or recess 34 for receiving a suitably complementarily formed or bent end portion 42 of the reaction yoke member 18, as will appear. The inner end of closure member 30 is likewise formed with a stepped down, reduced cylindrical portion 31 of substantially the same diameter as the inner end portion 29 of end cap 26 to likewise provide a space for the torsion spring 14. The peripheries of the two reduced portions 29 and 31 are thus effective to internally guide and also control the amount of tension that may be put on the spring 14. It will be noted that coaxial slots 28 and 32 are of still further importance in the assembling operation in that they provide guides for the end portions 20 and 21 of the helical coil spring. The end caps 26 and 30 may be made of plastic or metal, as desired.

The end caps or closure members 26 and 30 also have formed at the inner ends thereof respectively a complementary boss 29a and recess 31a which structure assures the spring 14 being centered in the assembly during the operation of the device and avoids undesirable distortions in the helical spring 14 when under load as when the belt is withdrawn from the reel. The helical spring 14 is so proportioned with reference to the inner periphery of the tubular reel 16 that when the same is relaxed, it provides an effective to inhibit the inadvertent winding of the reel in a direction that would otherwise unwind the coil spring beyond the point of normal freely relaxed condition thereof.

Referring in further detail to the reaction member or bale 18 in this preferred embodiment of FIGURES 2, 2A and 3, the same is in the form of a three-sided generally U-shaped bale or caliper-like yoke, having a wire or bar-like cross-section imparting a sturdy resiliency to the bale. The bale includes a central bar or arm portion 36 and two radially inwardly extending bar or arm portions 38 and 40. It is important to note that this construction makes it feasible to incorporate sufficient strength and resistance to the spreading of arms 38 and 40 to thus prevent the helical coil spring 14 from forcing the closure members 26 and 30 outwardly with reference to the terminal of the reel when the belt is fully extended, under which condition the spring 14 is tightly wound about the mandrel 29 and 31, at such time having its greatest coaxial length and hence exerting its maximum axial spreading force. Any spreading apart of the closure members would tend to cause malfunctioning of the retractor, such for example as would result from the separation of the inner terminals or reduced cylindrical portions 29 and 31 of the mandrel with the result that a convolution or convolutions of the helical coil would then make an entry into the space thus created between the inner ends thereof. The resulting reduction in the diameter of the convolution of the spring would produce a permanent distortion or set in the wire. It would thus appear that the coaxial terminals of arms 38 and 40 must resist the maximum coaxial force imposed by the fully wound spring. In order to do this, the bale must be constructed of a cross section having a sufficiently large dimension 18d in the axial direction to provide this resistance as distinguished from a bale made of sheet material, for example. One end or terminal of the radial side bar portion 40 is provided with means assuring non-rotative reception in non-circular slot 34 of end cap 30 thus preventing relative rotation therebetween. This relation is shown in this particular preferred modification as taking the form of an S-shaped bend 42 on the inner terminal of arm 40. This is an example only of one manner of connecting the reaction means 18 to the end cap 30 so that these two means will not be relatively rotatable in their assembly condition. The connection is such that in an assembled relation the reaction means or bale 18 is effectively connected to the right end of the spring 14 with the periphery 30a of closure member 30 functioning as a bearing or journal for the tubular reel 16 as viewed in FIGURES 3 and 4. The other side bar portion 38 of the reaction bale 18 is provided with means indicated at 44 received in the outer end of the tubular reel 16 for rotatably supporting the reel. In this modification, means 44 takes the form of a coaxially turned terminal on arm 38, functioning as a journal for the free rotation of the reel thereon through the intervening closure plug 26.

Radially inwardly extending arm 40 of bale reaction member 18 is provided with inwardly facing guide surface 18b adapted to guidably cooperate with one edge of a flat vehicle safety belt, while the other radially inwardly extending arm 38 is provided with inwardly facing guide surface 18c adapted to guidably cooperate with the opposite edge of a flat safety belt. It will be observed that surface 18a of arm 36 is substantially the same length as the width of the belt with which it must cooperate in providing the reaction for spring 14. It will be further noted that since, in the present modification, yoke 22 is stamped from or struck from the inner confines of the reel 16, and since some supporting metal 16a must be left between the base 23a and 24a of the respective tabs 23 and 24 and the extreme terminals of reel 16, the belt accommodated within the yoke cannot be of a width corresponding to the full length of reel 16. Therefore, in order that reaction surface 18a be substantially the same length as the width of the associated belt, radially extending arms 38 and 40 must be made to converge slightly from their position of association with the closure members 26 and 30 radially outwardly to the positions of their convergence with bar 36.

While the broad concept embodied in the herein disclosed modification of end closure members 26 and 30 form the basis of the broad claims in a companion case filed earlier in the name of Herbert A. McAninch, the more detailed aspects including the spring centering and guiding function performed by the guide slot structure 28, 32 of mandrels 29, 31 and the telescoping portions 29a and 31a of the mandrels, as well as the specific coupling structure 25, 27, 34, 42 and journal 44 or are claimed herein, the cases being assigned to the same assignee.

In operation, the belt take-up device 12 is installed on the belt 10 by first winding tubular member or reel proper 16 with the spring attached in the counter-clockwise direction, with respect to the reaction member 18 as viewed in FIGURE 2. This places the spring 14 in tension. The belt is introduced into the yoke 22 from the side of the belt and the yoke is then clipped to the belt section or bight portion 22a of belt 10 approximately at the midpoint of the belt section in its extended position as viewed in FIGURES 1 and 2. The tubular member or reel 16 is so connected to the belt that the bar portion 36 of the reaction member 18 lies on top of the belt as viewed in FIGURE 2, with the transverse slide or guide surface 18a engaging the belt. As the tension on the belt is relaxed by the user, the tension or spring load is increasingly released, thus turning the tubular member or reel 16 clockwise as viewed in FIGURE 2. This winds the belt onto the reel 16 in double spiral layers or increments. Thus, the spring need only be of such size and have such capacity as to enable the same to wind up on the reel essentially half of a belt length 10 shown in solid lines in FIGURE 1. It will be noted from FIGURE 1 that when the belt is in retracted position, the belt take-up means or retractor device with the belt rolled up thereon, may, as illustrated, engage the seat at the intersection therebetween as a stop for the unit.

Reference will now be made to the improved modification of the wire-like reaction bale shown in FIGURES 5 and 5A. It will be noted that this improved form of bale has particular application to the type of reel shown in FIGURE 3 wherein, as already pointed out, it is necessary to make the reel proper slightly longer than the maximum width allowable for the belt due to the manner in which the tangs 23 and 24 of the several modifications are formed or struck from internally of the tubular reel. The necessary converging of the side arms 138 and 140 is accomplished by forming these radially extending arms as shown to advantage in FIGURE 5. A first pair of radially outwardly extending arm portions 138a and 140a lie generally in parallel planes transverse to the axis of the tubular reel. The first pair of arm portions merge with a second pair of inwardly converging arm portions 138b and 140b. The second pair of converging arm portions in turn merge with a third pair of radially outwardly extending arm portions 138c and 140c; the latter likewise lie generally in a pair of parallel planes perpendicular to the axis of rotation of the tubular reel. The third pair of arm portions in turn merge with a fourth pair of arm portions 138d, 140d likewise lying in generally parallel planes perpendicular to the axis of rotation of the tubular reel and in turn merging with opposite terminals of belt engaging slide bar surface 118a of reaction bale 118. The belt engaging bar 136 on which surface 118a is formed and arm portions 138d and 140d lie in or define a plane intersection the plane defined by arm portions 138a and 140a at a substantial angle. The angle shown is about 90°. The angle may be of the order of 45° to 90°. This arrangement is important since it contributes positively to the effective guiding of the belt in an improved manner as will be apparent from a comparison of FIGURES 3 and 5A.

From an examination of FIGURE 5, in particular, it will be seen that parallel arm portions 140c and 138c are spaced apart substantially the same distance as the width of the belt 10, with angularly disposed parallel portions 140d and 138d being likewise spaced with the result that the belt is confiningly guided in a saddle-like construction which has been found to appreciably improve the guiding function of the bale, particularly when the belt is released by the passenger. Under these conditions, it has been found that the belt is more effectively guided in its accumulation on the reel than in previously available arrangements, so that there is no tendency for the successive undulations of double layers of belt to accumulate on the reel in a helter-skelter manner but, to the contrary, the edges of the respective successive convolutions lie in substantially the same plane as they are accumulated on the reel.

Turning now to the modification of the retractor device indicated generally at 212 in FIGURES 6, 6A and 6B, it will be seen that there is provided an improved construction of yoke for attaching the belt at the midsection thereof adjacent the periphery of the reel 216 and at the bight position 222a of the belt. Basically and essentially, this construction provides a bar-like fastening yoke 222 that is uninterrupted in the area of contact thereof with the belt at the bight portion 222a thereof. This is accomplished in this particular modification by constructing the yoke 222 with an uninterrupted belt engaging surface 222c and in a form that is releasable at the ends thereof, it being necessary to release only one end, for the purpose of inserting the belt from the side thereof without the necessity of threading the end of the belt through the yoke. This may be accomplished by spreading the radially inwardly extending arm portion of bale 218 to move circular ring 218d away from engagement with closure plug 230 as shown in dotted lines, whereupon the radially inwardly extending terminal portion 222b of bale 222 may be readily withdrawn from the closure plug as also indicated in dotted lines to thus insert the belt therein from the side of the belt, following which the terminal portion 222b of the yoke may be reinserted in the position shown in solid lines and ring 218c again placed in engagement with the terminal of closure plug 230 also as shown in solid lines. This unique construction broadly, as well as specifically, forms an important part of the present invention.

In summation, it will thus appear that there has been provided an improved self-contained resilient retractor unit or device 12 and 212 for vehicle safety belts of the flat substantial width type, which unit comprises in its essential composition means defining an elongated hollow tubular reel 16, 216 for receiving the belt, this arrangement being particularly adapted for receiving the belt on the reel in successive superimposed coils or convolutions, the anchor structure 22, 222 carried at the periphery of the hollow reel serving to connect the belt to the reel at a position intermediate the length of the belt—sometimes referred to as the bight portion 22a, 222a, reaction defining means indicated generally at 18, 118 and 218 in the form of a generally U-shaped wire-like bale or hinge (FIGURES 3, 5 and 6) and in respect to which the reel is rotatably mounted or connected through uniquely constructed end closure plugs in the terminal of said hollow tubular reel, the reaction means having contact slide surfaces 18a, 118a, 218a thereon substantially spaced from the axis of rotation of the reel to provide the required leverage, and which surface extends transversely of the belt and which also has a length substantially the same as the width of the belt, this surface being arranged for sliding contact along the flat face surface of the belt, the reaction means being further particularly characterized by including at least one pair of radially inwardly extending arms (38, 40 in FIGURE 3; 138a, 138b, 138c, 140a, 140b, and 140c in FIGURES 5, 5A; and 238, 240 in FIGURE 6), pivoted about the axis of the tubular reel, the inner opposed faces 18b and 18c; 118b, 118c; and 218b, 218c of these arms merging with the contact slide surfaces 18a; 118a and 218a respectively functioning to confine and guide the side edges of the belt, and a helical torsion coiled spring positioned within the hollow reel 16, 216, one end terminal of the spring being provided with means for anchoring the same in relation to said reel and the other end terminal of the spring being provided with means for anchoring the same relative to the reaction bale means 18, 118 and 218 whereby upon the pretensioning of the coil spring and the connection of the reel anchor means to the bight portion of a belt, the belt will be rolled into double ply, superimposed spiral coils upon the hollow reel during the sliding of the contact surface 18a, 118a, 218a of said reaction means along the flat face of the belt, this arrangement being further particularly characterized by the fact that the above defined structure is effective to expose the belt reel as well as the belt thereon to ready observation by the user, making the extent of the tension in the belt as well as its rolled up or completely unrolled condition readily apparent at all times; and thus revealing to the user the exact state of operation, and thereby adding a particularly important safety factor.

While certain preferred embodiments of the invention have been specifically disclosed, it is understood that the invention is not limited thereto as a number of variations will be readily apparent to those skilled in the art, and the invention is to be given the broadest interpretation within the terms of the following claims that is commensurate with the prior art.

What is claimed is:

1. A vehicle safety belt retractor device adapted to be connected to and carried on a belt of the type having a flat surface of substantial width relative to the thickness thereof, comprising:

(a) means defining a hollow tubular reel assembly including means adapted for connecting said reel to a safety belt having a relatively flat surface of substantial width, said connection adapted to be located between and spaced from the ends of said belt, said reel defining means including plug-like closure means for the respective terminal ends of said tubular reel, a first one of said closure means being particularly characterized by being formed with a bearing surface on the periphery thereof for rotatably supporting a first terminal portion of said reel in journalled relation thereto, said first closure means having a coaxially inwardly extending reduced cylindrical portion in spaced relation to the internal periphery of said tubular reel and adapted to provide a control space for the reception of the convolutions of a helical coil spring therebetween, a coaxial slot in said reduced cylindrical portion having a centrally facing open terminal end, the second one of said plug-like closure means being formed with a coupling protuberance thereon, a complementary recess formed in said tubular reel member for the reception of said protuberance on said closure member for providing driving coupling relationship between said second closure member and said tubular reel, said second closure member likewise being formed with a second reduced cylindrical portion extending coaxially within said tubular reel complementary to and joining with said first named reduced cylindrical portion of said first named closure member and providing a space between the outer periphery of said second reduced cylindrical portion and the inner periphery of said tubular member adapted to receive convolutions of a helical coil spring, said second reduced cylindrical portion likewise having a coaxially extending inwardly facing open ended slot therein;

(b) torque reaction bale defining means provided with a belt engaging and guide surface thereon of substantially the same width as that of said belt, said surface being operative to contact said belt across substantially the full transverse dimension thereof in belt guiding relation as the same is moved to and from said reel, said bale being further characterized by the inclusion of a first radially inwardly extending arm formed with a non-circular terminal thereon located generally coaxially of said first named closure member, said first named closure member being formed with a coaxially outwardly facing non-circular recess for cooperation with the terminal of said bale for anchoring the said closure member to said arm, said bale further including a second radially inwardly extending arm formed at the terminal thereof with a coaxially inwardly extending journal defining portion, said second named closure member being formed with a complementary cylindrical recess providing for the journalled rotation of said closure member and reel on said journal;

(c) energy storing means including means defining an elongated helical torsion spring connected between said reel and said reaction bale and functioning to cause belt-winding rotation of said reel as energy contained in said spring is released when said belt retractor device is installed on a belt, said arrangement being further particularly characterized by said helical torsion spring means being positioned within said hollow reel in embracing relation about said reduced cylindrical portions of said closure members, the respective opposite terminals of said elongated helical coil spring including diametrically extending portions received respectively in said coaxially extending open ended slots in the reduced section of said closure members, said reduced cylindrical portions of said closure members being further characterized by having formed thereon complementary telescoping terminal portions effective to maintain said reduced cylindrical portions in coaxial alignment, said reduced cylindrical portions functioning to internally support and control the action of said elongated helical coil spring when the same is under load, said helical coil spring being so proportioned and arranged as to engage the inner periphery of said tubular reel member when relaxed, whereby to provide a one way brake, thus inhibiting the inadvertent turning of the reel in a direction and to the extent that could otherwise unwind the coil spring beyond the point of relaxation thereof.

2. A vehicle passenger safety belt retractor device adapted to be connected to and mounted on a safety belt of the type having a flat surface of substantial width relative to the thickness thereof, said device comprising:

(a) means defining an elongated hollow tubular reel of a length not appreciably greater than the width of the safety belt and a diameter only a small fraction of the coaxial length of said reel, said reel being adapted to receive the flat surface of a safety belt in spiral coiled relation thereon, separate fastening means carried by and extending radially beyond the periphery of said tubular reel a distance substantially the thickness of the belt, extending parallel to the axis of the reel and having an axial dimension corresponding to the width of the belt, said fastening means functioning to embrace and attach the belt at the periphery of said tubular reel and at the bight position of the belt intermediate of and spaced from the ends of the belt, said attaching means being particularly characterized by having at least one portion thereof releasable from said reel for ready insertion of the belt at the side of the belt, thus making it unnecessary to thread the end of the belt into the fastening position;

(b) means defining a torque reaction bale in respect to which the reel is rotatably mounted, said reaction bale having a contact guide surface thereon substantially spaced from the axis of rotation of the reel and of a length substantially the same as the width of the belt, and arranged for guiding and reaction contact along and transversely of the flat face surface of the belt, means defining stopper-like closure plugs receivable within the respective terminal ends of said tubular reel, a first one of said stopper-like closure plugs being formed on the periphery thereof with a bearing surface supporting a first end of said tubular reel rotatable in bearing relation thereon, said first named closure member including means for non-rotatably associating the same with said reaction bale, said other stopper-like closure member having means defining a coupling element, complementary coupling means on said reel for non-rotatively coupling said reel and said second closure plug in driving relation, said plug being further provided with a coaxially extending cylindrical recess therein and journal means carried at the inner terminal of said reaction bale receivable within said cylindrical opening for rotatably supporting said reel; and (c) an elongated helical coil torsion spring positioned within said tubular reel of an overall length extending between said two stopper-like closure members, and means connecting one terminal of said helical coil spring in anchored relation to said reaction bale, and means connecting said other terminal of said helical coil spring in driving relationship with said reel whereby when said belt is withdrawn from the reel, it causes said reel to rotate, placing said torsion spring in tension and discharging the belt in both directions at both sides of said reel simultaneously and functioning further upon the relaxation of the belt from the user to give up its energy and cause said reel to rotate and simultaneously roll up said belt from both sides of said reel in a double layered, spiral formation, said belt take-up device being carried entirely by the belt and moving with the belt relative to the fixed belt anchor during the extension and retraction of the belt.

3. A vehicle safety belt retractor device adapted to be connected to and mounted on a safety belt of the type adapted to be anchored at one end to the vehicle, said belt having a flat surface of substantial width relative to the thickness thereof, said device comprising:

(a) means defining an elongated hollow tubular reel of a length not appreciably greater than the width of the safety belt and of a diameter only a small fraction of the coaxial length of said tubular reel, said reel being adapted to receive the flat surface of a safety belt in spiral coiled relation thereon; separate fastening means for the belt at the periphery of said reel carried by said reel, said fastening means being formed with a belt engaging surface extending generally parallel to the axis of the reel transversely of said belt and having an axial dimension corresponding generally to the width of the belt and spaced a distance from the periphery of the reel not substantially less than the thickness of the belt, said fastening means functioning to embrace and attach the belt to said reel at the bight position of the belt intermediate of and spaced from the ends of the belt, said attaching means being particularly characterized by having at least one portion thereof readily releasable from said reel for ready insertion of the belt at the side of said belt, thus making it unnecessary to thread an end of the belt into fastening position;

(b) means defining a torque reaction wire-like bale in respect to which the reel is rotatably mounted, said reaction bale having a contact guide surface thereon substantially spaced from the axis of rotation of the reel beyond the position of said fastening means and of a length substantially the same as the width of the belt, and arranged for guiding contact along and transverse to the flat face surface of the belt, means for rotatably associating said reaction bale with said reel including means defining stopper-like closure plugs receivable respectively within the opposite terminals of said tubular reel and associated in supporting relationship with said reaction bale, means defining an elongated helical coil torsion spring positioned within said hollow tubular reel and extending between said closure stopper-like plugs, and means connecting a first terminal of said helical coil spring in anchored relationship with said bale, and means for connecting the opposite terminal of said helical coil spring in driving relation to said tubular reel, whereby when the belt is withdrawn from the reel, it causes said reel to be rotated, placing said torsion spring in tension and discharging the belt in both directions from both sides of said reel simultaneously and functioning further upon the relaxation of the belt by the user to give up its energy and cause said reel to rotate and simultaneously to roll up upon said reel from both sides thereof in a double layered, spiral formation, said belt take-up device being carried entirely by the belt and moving with the belt relative to the vehicle belt anchor during the extension and retraction of the belt.

4. A vehicle passenger safety belt retractor device adapted to be connected to and mounted on a safety belt of the type having a flat surface of substantial width relative to the thickness thereof, said device comprising:

(a) means defining an elongated hollow tubular reel of a length not appreciably greater than the width of the safety belt and of a diameter only a small fraction of the coaxial length of said tubular reel, said reel being adapted to receive the flat surface of a safety belt in spiral coiled relation thereon, fastening means for the belt at the periphery of said reel carried by said reel, said fastening means being formed with a belt engaging surface extending generally parallel to the axis of the reel and having an axial dimension corresponding generally to the width of the belt and spaced a distance from the periphery of the reel and not substantially less than the thickness of the belt, said fastening means functioning to embrace and attach the belt to the periphery of said reel at the bight position of the belt intermediate of and spaced from the ends of the belt, said attaching means being particularly characterized by having at least one portion thereof releasable from said reel for ready insertion of the belt at the side of said belt, thus making it unnecessary to thread an end of the belt into fastening position;

(b) means defining a torque reaction bar-like bale in respect to which the reel is rotatably mounted, said reaction bale having a contact slide surface thereon substantially spaced from the axis of rotation of the reel beyond the position of said fastening means and of a length substantially the same as the width of the belt, and arranged for sliding contact along the flat face surface of the belt, said bale being particularly characterized by the inclusion of a first pair of radially outwardly extending arms merging with the terminals of said reaction contact sliding surface, each of said arms comprising a first portion extending at right angles to the axis of the reel from a position adjacent the terminals of said tubular reel, and a pair of intermediate converging portions, a second pair of arm portions having a spacing corresponding to the width of the belt lying in parallel planes, and a third pair of arm portions defining a plane extending at an angle to the plane defined by said first pair of parallel portions and merging with the terminals of said contact slide surface, said last named arm portions lying adjacent the opposite edges of the flat belt and functioning as confining guide means therefor adjacent the terminals of said first named contact slide surface for the flat face of said belt;

(c) means for rotatably associating a belt with said reel including means defining stopper-like closure plugs receivable respectively within the opposite terminals of said tubular reel and associated in supporting relationship with the radical inner terminals of said first named pair of parallel arm portions; an elongated helical coil torsion spring positioned within said hollow tubular reel and extending between the inner portions of said clossure stopper-like plugs, means connecting a first terminal of said helical coil spring in anchored relationship with the radial inner terminal portion of a first one of said first named parallel arm portions of said bale and means for connecting the opposite terminal of said helical coil spring in driving relation to said tubular reel whereby when the belt is withdrawn from the reel, it causes said reel to be rotated, placing said torsion spring in tension and discharging the belt in both directions from both sides of said reel simultaneously and functioning further upon the relaxation of the belt by the user to give up its energy and cause said reel to rotate and simultaneously to roll up upon said reel from both sides thereof, in a double layered spiral formation, said belt take-up device being carried entirely by the belt and moving with the belt relative to the vehicle belt anchor during the extension and retraction of the belt.

5. A vehicle passenger safety belt retractor device adapted to be connected to and mounted on a safety belt of the type having a flat surface of substantial width relative to the thickness thereof, with one end anchored to a vehicle and the other end carrying a double element, said device comprising:

(a) means defining an elongated hollow tubular reel of a length not appreciably greater than the width of the safety belt and of a diameter only a small fraction of the coaxial length of said tubular reel, said reel being adapted to receive the flat surface of a safety belt in spiral coiled relation thereon;

(b) fastening means for the belt at the periphery of said reel carried by said reel;

(c) means defining a torque reaction bar-like bale in respect to which the reel is rotatably mounted, said reaction bale having a contact slide surface thereon substantially spaced from the axis of rotation of the reel beyond the position of said fastening means and of a length substantially the same as the width of the belt, and arranged for sliding contact along the flat face surface of the belt for taking torque reaction entirely against the belt, said bale being particularly characterized by the inclusion of a first pair of radially outwardly extending arms merging with the terminals of said reaction contact sliding surface, each of said arms comprising a first portion extending at right angles to the axis of the reel from a position adjacent the terminals of said tubular reel, and a pair of intermediate converging portions, a second pair of arm portions having a spacing corresponding to the width of the belt lying in parallel planes, and a third pair of arm portions defining a plane extending at an angle to the plane defined by said first pair of parallel portions and merging with the terminals of said contact slide surface, said last named arm portions lying adjacent the opposite edges of the flat belt and functioning as confining guide means therefor adjacent the terminals of said first named contact slide surface for the flat face of said belt;

(d) means for rotatably associating said reaction bale with said reel including means defining stopper-like closure plugs receivable respectively within the opposite terminals of said tubular reel and associated in supporting relationship with the radial inner terminals of said first named pair of parallel arm portions; an elongated helical coil torsion spring positioned within said hollow tubular reel and extending between the inner portions of said closure stopper-like plugs, means connecting a first terminal of said helical coil spring in anchored relationship with the radial inner terminal portion of a first one of said first named parallel arm portions of said bale and means for connecting the opposite terminal of said helical coil spring in driving relation to said tubular reel whereby when the belt is withdrawn from the reel, it causes said reel to be rotated, placing said torsion spring in tension and discharging the belt in both directions from both sides of said reel simultaneously and functioning further upon the relaxation of the belt by the user to give up its energy and cause said reel to rotate and simultaneously to roll up upon said reel from both sides thereof in a double layered spiral formation, said belt take-up device being adapted to be carried entirely by the belt and moving with the belt relative to the vehicle belt anchor during the extension and retraction of the belt, the pull being entirely and exclusively through the belt to the vehicle belt anchor when the belt is fully extended.

6. A self-contained resilient take-up unit adapted for a vehicle passenger safety seat belt of the flat type having a substantial width relative to the thickness thereof, and having vehicle anchored and unanchored ends, said take-up unit comprising: means defining an elongated hollow tubular reel upon which the flat surface of a seat belt is adapted to be received in double spiral coiled relation when retracted, means defining a reel belt anchor extending from and carried on the periphery of said tubular reel for connection with the belt intermediate the ends thereof, said reel belt anchor means being in the form of a bar-like yoke having an uninterrupted belt engaging surface adapted to extend transversely of a belt and being particularly characterized by having at least one portion thereof readily separable with reference to said tubular reel providing for the ready introduction of the belt from the side intermediate the ends thereof; means defining an open to view generally U-shaped bale of bar-like cross-section, for taking torque reaction entirely against the belt, said reaction bale including a contact guide surface substantially spaced from the axis of rotation of the reel and of a length substantially the same as the width of the belt, and arranged for guiding and reaction contact with the flat surface of the belt; and an elongated torsion coil spring confined within said tubular reel and extending coaxially thereof, one end of said spring being connected in driving relation to said reel adjacent a first terminal of said reel and the other end of said spring being anchored in relation to said reaction bale adjacent the other terminal of said reel, said arrangement including at least one stopper-like closure plug at least partially inserted within one terminal of said tubular reel and functioning to support the associated terminal of said reel in rotative relation with reference to said reaction means, said arrangement being particularly characterized by said bar-like cross-section being made sufficiently sturdy to thus effectively prevent the winding up of said spring upon full extension of the belt from ejecting said stopper-like closure plug axially relative to said reel when the belt is placed in protective relationship about the vehicle passenger, the tension pull along the belt in fully extended position being absorbed directly through the belt to the vehicle anchor, said hollow reel being positioned on the belt by said barlike yoke and by the reaction on the belt of the said bale, the retraction and withdrawal of said belt towards and away from the vehicle belt anchor being effective to cause said take-up unit to similarly travel towards and away from said belt anchor.

7. A self-contained retractor unit for a vehicle passenger safety seat belt of the flat type having a substantial width relative to the thickness thereof, having one end adapted to be anchored to the vehicle and the other end adapted to be placed about the passenger; said unit comprising means defining an elongated hollow tubular reel having a coaxial length substantially the same as the width of said belt and upon which the flat surface of a safety belt is adapted to be received in double spiral coiled relation; fastening means for said belt intermediate the ends thereof extending from and carried on the periphery of said reel, said means being in the form of a bar-like member having an uninterrupted belt engaging surface extending transversely of the belt and having one portion thereof releasable with reference to said tubular reel for the ready introduction of a belt from the side of said belt intermediate the ends thereof; means defining an open bar-like reaction bale in respect to which the said reel is rotatably mounted, said reaction means having a contact guide surface substantailly spaced from the axis of rotation of the reel and of a length substantially the same as the width of the belt, and arranged for guiding contact along the flat face surface of the belt transversely thereof, and an elongated helical coil torsion spring confined within said tubular reel and extending coaxially thereof, one end of said spring being connected in driving relation to said reel adjacent the first terminal of said reel and the other end of said spring being anchored in relation to said reaction bale adjacent the other terminal of said reel, means defining at least one stopper-like closure plug inserted within one terminal of said tubular reel and functioning to support said terminal of said reel in rotative relation with reference to said reaction means; and means functioning to support the other terminal of said reel in non-rotative relation with reference to said reaction means, whereby when the belt is completely withdrawn from the reel and in fully extended functional position about a passenger, the pull is directly through the belt to the vehicle anchorage and the retractor unit is merely supported adjacent the belt without being subject to the forces of impact imposed upon the belt by the passenger.

8. In a vehicle passenger safety belt retractor device, including means defining a take-up reel unit adapted for the reception of a flat type of safety belt having substantial width relative to the thickness thereof, and having one end adapted to be anchored to a vehicle and an unanchored buckle element supporting end, said unit including belt connecting means adapted to be connected with the belt intermediate and spaced from the anchor end and buckle element end of the belt, said unit comprising: an elongated hollow reel having a diameter only a small fraction of the length of said reel for the reception of said vehicle passenger safety belt in double spiral relationship thereon; energy storing means in the form of an elongated helical coil torsion spring confined within said hollow reel and extending axially substantially co-extensively with the width of the belt; means defining a single visibly open torque reaction bale of a bar-like construction and cross section for engaging said belt throughout the transverse dimension of the belt at a position spaced from and parallel to the axis of said reel and in guiding torque reaction relation to said belt, means connecting said bale with said reel in rotatable relation thereto, said means including means connecting one end of said torsion spring in anchored relation to said reaction bale and means for connecting the other end of said torsion spring in driving relation to said reel, said means further including closure means for the respective terminals of said hollow tubular reel, said closure means for at least one terminal of said reel being constructed in the form of a stopper-like member having an inner reduced coaxially extending cylindrical portion inserted within said one terminal of said hollow reel and functioning as an internal mandrel and guide for said helical coil spring, said bar-like cross section reaction bale being made sufficiently sturdy to thus effectively prevent the winding up of said spring from ejecting said stopper-like closure member axially relative to said reel upon the tensioning of the belt by placement thereof in protective relation about the vehicle passenger in fully extended position, whereby the tension pull along and through the belt in fully extended position will be absorbed directly through the belt to the anchor end thereof, said hollow reel then being supported adjacent and in contact with said belt by said connecting means, the retraction and withdrawal of said belt towards and away from the anchor end thereof being effective to cause said retractor device to similarly travel toward and away from said anchor end.

9. In a vehicle passenger safety belt retractor device including means defining a take-up reel unit adapted for the reception of a flat type of safety belt having substantial width relative to the thickness thereof, and adapted to have one terminal of said belt anchored to a vehicle and one terminal unanchored and adapted to carry a buckle element, said unit being adapted for connection to, and mounting on the belt intermediate of and spaced from the anchor and buckle terminals thereof, said unit comprising: means defining an elongated tubular reel having a diameter only a small fraction of the length of said reel for the reception of a safety belt in double spiral relationship thereon in retracted position; tab defining means struck from the wall of the reel internally of the confines of the periphery of said tubular reel for fastening the belt to the periphery of said reel, said tab means including a belt engaging surface extending generally parallel to the axis of said tubular reel transversely of said belt and spaced radially outwardly a distance from the periphery of the reel not substantially less than the thickness of the belt, said tab means functioning to embraceably and clampingly engage the belt at the bite position of the belt intermediate of and spaced from the terminals of the belt, said fastening means having an opening therein for the ready insertion of the belt at the sides thereof, thus making it unnecessary to thread an end of the belt into fastening position; energy storing means in the form of an elongated helical torsion spring confined within said hollow reel and extending axially substantially coextensively of the width of the belt; means defining a visibly open reaction bale of a bar-like construction in cross-section for guidably engaging said belt at a position spaced from said reel and supporting said reel in guiding torque reaction relation to said belt, means connecting one end of said torsion spring in anchored relation to said reaction bale and means for connecting the other end of said torsion spring in driving relation to said reel, including closure defining means for the respective terminals of said hollow tubular reel comprising at least one stopper-like member having at least a portion thereof extending coaxially within one terminal of said reel and functioning as a bearing for said terminal of said tubular reel, whereby the tension pull along the belt when in fully extended position is taken entirely through the belt directly to the anchored end thereof, said hollow reel thus being supported on the belt through said peripheral tab connecting means and said reaction bale means, the retraction and withdrawal of said belt toward and away from the anchored end thereof being effective to cause said retractor device to similarly travel toward and away from said anchored end.

10. In a vehicle passenger safety belt retractor device, including means defining a take-up reel adapted for the reception of a flat type of safety belt, said belt having substantial width relative to the thickness thereof, and being adapted for connection to a vehicle to provide anchored and unanchored ends, the take-up reel unit being adapted for connection to, and mounting on the belt intermediate of and spaced from the anchored and unanchored ends of the belt, said unit comprising: an elongated hollow tubular reel having a diameter only a small fraction of the coaxial length of said tubular reel for the reception of the safety belt in double spiral relation thereon when retracted; means carried on and extending radially outwardly from the periphery of the reel for fastening the belt to the tubular reel, said means comprising tabs struck radially outwardly from the surface of the tubular reel intermediate the ends of the reel, said tabs extending generally axially and terminating in spaced juxtaposed relation to thus provide an opening therebetween for the ready insertion of the belt from the sides thereof; means defining a singly visibly open reaction bale of a generally U-shaped and bar-like construction in cross section and having spaced opposed open terminals and a closed connecting portion for engaging said belt at a position spaced from said reel, said closed connecting portion being in guiding torque reaction relation to said belt throughout the transverse dimension of said belt, said reel functioning to carry said bale at the terminals thereof in relative rotatable relation thereto; helical torsion coil spring confined within said hollow reel; and means connecting one end of said torsion spring in anchored relation to said reaction bale and means for connecting the other end of said torsion spring in driving relation to said reel; whereby the tension pull along the belt in fully extended position is absorbed entirely and directly by the anchored end of the belt, said tubular reel thus being supported on the belt through said peripheral connecting tabs and said bale, the retraction and withdrawal of said belt toward and away from the belt anchored end being effective to cause said retractor device to travel toward and away from said belt anchored end.

(References on following page)

References Cited by the Examiner

UNITED STATES PATENTS

| | | | |
|---|---|---|---|
| 438,779 | 10/1890 | Newton et al. | 242—107.12 |
| 653,796 | 7/1900 | Etlinger | 242—74.2 |
| 662,230 | 11/1900 | Fenton | 242—74.2 |
| 916,325 | 3/1909 | Kelly | 242—118 |
| 1,313,644 | 8/1919 | Simon. | |
| 1,459,772 | 6/1923 | Kirsch | 242—74.2 |
| 2,037,324 | 4/1936 | Heusinkveld et al. | 242—107.11 |
| 2,541,476 | 2/1951 | Mihalyi. | |
| 2,834,314 | 5/1958 | Moore | 242—107.12 X |

FOREIGN PATENTS

| | | |
|---|---|---|
| 722,801 | 1/1932 | France. |
| 501,543 | 7/1930 | Germany. |

FRANCIS K. ZUGEL, *Acting Primary Examiner.*

FRANK B. SHERRY, CASMIR A. NUNBERG, *Examiners.*

R. B. FARLEY, *Assistant Examiner.*